Feb. 4, 1958 J. L. ZEHNER 2,822,489
TEMPERATURE RESPONSIVE ARRANGEMENT
Filed Sept. 15, 1953
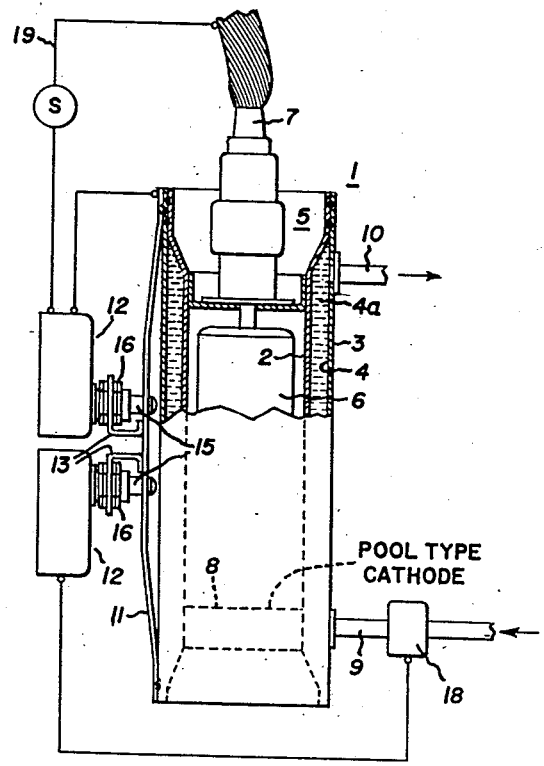
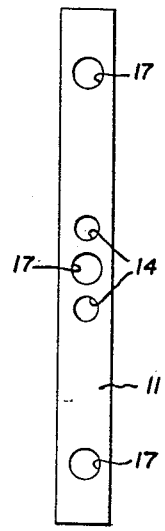
INVENTOR:
JAMES L. ZEHNER,
BY Charles M. Hutchins
HIS ATTORNEY.

United States Patent Office 2,822,489
Patented Feb. 4, 1958

2,822,489

TEMPERATURE RESPONSIVE ARRANGEMENT

James L. Zehner, Schenectady, N. Y., assignor to General Electric Company, a corporation of New York Application September 15, 1953, Serial No. 380,281

23 Claims. (Cl. 313—22)

My invention relates to temperature responsive controlling means and pertains more particularly to an improved arrangement for controlling the cooling of enveloped devices subject to heating and protecting such devices against overheating.

Many enveloped devices which are subject to heating, such as electric discharge devices of the ignitron type, are cooled by forming the enveloping member or envelope with spaced apart inner and outer walls to provide a chamber and circulating a coolant such as water therethrough. In such an arrangement it is desirable to provide means for controlling circulation of the coolant in rapid response to temperature changes of the device, thereby to conserve coolant and insure operation of the device within a predetermined temperature range. Additionally, as relates specifically to power conversion tubes such as ignitrons, it is desirable to employ as low temperature coolant as is available. When using such coolant, means are required for so controlling coolant circulation as to avoid deleterious effects of overcooling on the operation of the tubes, specifically, overcooling which causes undesirably low vapor pressures in the tubes. It is also desirous to provide in such an arrangement means for protecting the device against overheating and resultant high vapor pressures in the event that the cooling means is ineffectual in maintaining the temperature of the device below a predetermined maximum above the predetermined range.

Accordingly, it is a primary object of my invention to provide a new and improved arrangement for controlling the cooling of enveloped devices subject to heating and protecting such devices against overheating.

Another object of my invention is to provide, with an enveloped device subject to heating and having means by which a circulating coolant is effective for cooling the device, a new and improved means for conserving the coolant.

Another object of my invention is to provide, with an enveloped device subject to heating and having means through which a coolant is circulated for cooling the device, a new and improved fast-acting temperature response arrangement for controlling the coolant circulation as to insure operation of the device within a predetermined temperature range.

Another object of my invention is to provide, with an enveloped device subject to heating and having coolant circulating means adapted for being controlled to provide operation of the device within a predetermined temperature range, a new and improved temperature responsive means adapted for protecting the device from overheating in the event that the temperature of the device reaches a predetermined maximum above the predetermined range.

Another object of my invention is to provide in an electric discharge device including an envelope containing a pool-type electrode and adapted for being cooled by coolant circulation a new and improved arrangement adapted for controlling the coolant circulation in direct response to the temperature of the envelope.

Another object of my invention is to provide an ignitron adapted for being cooled by coolant circulation and integrally including temperature responsive means adapted for controlling the coolant circulation and protecting the ignitron from overheating.

Still another object of my invention is to provide an ignitron adapted for employing as low temperature coolant as available and including means for avoiding overcooling thereof and minimizing condensation or "sweating" on the exterior thereof.

Further objects and advantages of my invention will become apparent as the following description proceeds and the features of novelty which characterize my invention will be pointed out with particularity in the claims annexed to and forming part of this specification.

In carrying out the objects of my invention I provide an envelope housing a device subject to heating. The envelope includes spaced apart inner and outer walls forming a chamber for having a coolant circulated therethrough. A bowed member has its ends secured at spaced apart points on the envelope. Switching means are also provided which are operated in response to changes of the bow in the bowed member. The bow of the bowed member changes in response to relative elongation and contraction of the envelope and the bowed member, as effected by the temperature of the device. The inner wall of the envelope is the critical temperature surface of the device and its expansion and contraction effect rapid change in the bow of the bowed member in response to temperature changes of the inner wall. The switching means operate at different degrees of change in the bow of the bowed member and are adapted for controlling the coolant circulation to maintain the operating temperature of the device within a predetermined range and for avoiding overheating of the device if the temperature reaches a predetermined maximum above the predetermined range.

For a better understanding of my invention reference may be had to the accompanying drawing in which:

Fig. 1 is a side elevational view of an electric discharge device of the ignitron type partially broken away to illustrate my invention incorporated therein; and Fig. 2 is a plan view of the bowed member.

Referring to the drawing, I have shown in Fig. 1 my invention as applied to a power conversion tube or electric discharge device of the ignitron type including an elongated cylindrical enveloping member or envelope 1. The envelope 1 is preferably formed of stainless steel and includes spaced apart inner and outer walls 2 and 3, respectively, for forming an elongated cylindrical chamber 4. This construction can be obtained by first fitting in a straight walled outer cylinder an inner cylinder of smaller diameter and having its ends expanded in diameter to fit the outer cylinder and then sealing, as by welding, the corresponding edges of the cylinders in the manner shown in Fig. 1.

The envelope is closed at its upper end by a header assembly including an anode seal, designated by the numeral 5, for supporting a generally cylindrical positive electrode or anode 6 centrally within the upper end of the envelope. As is well understood, the seal construction supports the anode in insulated relation with respect to the envelope and provides an externally accessible anode terminal designated by the numeral 7. The anode, in accordance with common practice in electric discharge devices of this type, can be formed of graphite.

The opposite end of the cylindrical envelope is closed by a cup-shaped header (not shown) which is welded to the lower end of the inner cylinder 2 to form a hermetic seal. The negative electrode or cathode of the device is contained in the envelope and is provided by a pool of conducting liquid, indicated by 8, which to advantage may be mercury. In the operation of power conversion tubes or devices of this character some of the cathode 8 is vaporized and an arc discharge is established between the surface of the cathode and the anode.

As will be readily appreciated by those skilled in the art, considerable difficulty is experienced in providing discharge devices of this character which are relatively free from arc back resulting from high vapor pressure in the envelope. One method of minimizing arc back in this type of device is by cooling the envelope during operation of the device to condense the vapor therein on the inner wall of the envelope and to cause it to flow back to the pool thereof. For this purpose the chamber 4 is adapted for having a coolant indicated by 4a circulated therethrough. As seen in Fig. 1 the chamber 4 is provided with an inlet 9 for admitting the coolant thereinto and an outlet 10 for drawing off the cooling medium after it is laden with heat extracted from the evaporated portion of the cathode and with heat radiated to the envelope walls from the anode 6.

In cooling the particular type of device illustrated, it is desirable to employ as low temperature coolant as available. When such coolant is employed, means are required to avoid overcooling or operation of the device below a predetermined temperature range which would result in undesirably low vapor pressure in the tube and thereby adversely affect the operation of the device. Additionally, when employing a low temperature coolant it is desirable to provide means for minimizing condensation or "sweating" on the exterior of the tube.

Now in order to conserve coolant and insure operation of the device within a predetermined temperature range conducive to the satisfactory operation of the device, and at which "sweating" will be minimized I have provided means for controlling the coolant circulation in rapid response to temperature changes of the device. This controlling means includes a bowed strip or member 11 having its ends secured at spaced apart points on the outer wall 3 of the envelope, as by welding. In this arrangement the bow of the bowed member changes in accordance with relative elongation or expansion and contraction of the envelope and the bowed member. That is, with expansion of the envelope, the bow of the bowed member is diminished, while contraction of the envelope is effective in returning the member to its original bowed state. This changing of the bow in the bowed member is effectively employed to operate switching means which are adapted for controlling the coolant circulation and for avoiding overheating of the device in the event that the cooling means is not effectual in maintaining the temperature of the device below a predetermined maximum above the desired operating range.

My switching means can comprise a plurality of switches 12 suitably mounted by brackets 13 on the bowed member 11. As seen in Fig. 2, the bowed member can be formed with apertures 14. Operating plungers 15 on the switches extend therethrough toward the outer wall of the envelope. In this arrangement, diminution of the bow of the bowed member, as effected by the expansion of the envelope, moves the plungers toward the envelope for engagement therewith to operate the switches; and contraction of the envelope returns the bowed member to its original state for moving the plungers out of engagement with the wall to again operate the switches.

In the arrangement shown, one switch is adapted for engaging the envelope and being thereby operated at a predetermined degree of change in the bow of the bowed member and the other switch is adapted for operating at a predetermined different degree of change in the bow of the bowed member. Thus one of the switches 12 is adaptable for so controlling the coolant, as by means of an electrically actuated valve control means which is designated 18 in Fig. 1 and which may be of any well-known and commonly employed type, that its circulation through the chamber 4 is insured whenever its effect is required to maintain the device within the predetermined temperature range and to stop circulation, and thereby conserve coolant and avoid overcooling, whenever its effect is no longer required. Additionally, the other switch is adaptable for avoiding overheating of the device by deenergizing the control circuit 19 or energizing a suitable alarm if for any reason the cooling means is ineffectual in maintaining the temperature of the device below a predetermined maximum above the predetermined range.

As shown, the switches 12 can include adjusting nuts 16 which are individually adjustable for varying the spacing between the plungers and the outer wall of the envelope and thereby to determine the range within which the temperature of the device is to be maintained, and the temperature at which the control circuit is to be deenergized or an alarm given to avoid overheating.

It will be seen that while I have shown switches which are carried by the bowed member and include plungers adapted for being operated by engagement with the envelope, the switches can alternatively be mounted on the envelope and be actuated by the bowed member. Additionally, switch means can be mounted elsewhere than on the bowed member or envelope and still be operated through changes of the bow in the bowed member.

Additionally, my structure incorporates means for insuring rapid changes in the bow of the bowed member and correspondingly rapid operation of the switching means in response to temperature changes in the envelope. One such means comprises weakening holes 17 formed in the bowed strip 11 adjacent its extremities and at its midpoint. This arrangement of weakening holes facilitates bending or changes in the bow of the bowed member in response to relative expansion and contraction of the envelope and the bowed member while still providing sufficient rigidity in the strip to prevent normal vibration from switch operation. Also for the purpose of effecting rapid response to temperature changes of the envelope and minimizing the effect of ambient temperature changes on the temperature settings of the device, I form the bowed member of a material having a smaller coefficient of expansion than the material of the envelope. This results in greater differences in relative expansion and contraction of the envelope and bowed member than would otherwise occur, effecting more rapid change in the bow of the bowed member in response to temperature changes.

The differences in the relative expansion and contraction of the envelope and bowed member are made still greater and in more rapid response to temperature changes of a device in the envelope by constructing the envelope so that the inner wall 12 is in direct heat exchange relationship with vaporized portions of the cathode 8 and heat radiated thereto from the anode 6. The inner wall expands and contracts more rapidly than does the outer wall in response to temperature changes in the envelope. Thus, during expansion or elongation of the inner wall, it actually accelerates expansion of the outer wall upon which the bowed strip is mounted. That is, the inner wall thermally expands or is elongated and begins stretching the outer wall and thereby straightens the bowed strip before the temperature, and therefore the length, of the outer wall has had a chance to change appreciably. When cooled to the minimum temperature of the predetermined range, the inner wall contracts, permitting contraction of the outer wall. The outer wall, which was previously held in tension by the stretching effect of the elongated inner wall, rapidly contracts and is effective in changing the bow of the bowed member, thereby to operate the switches 12 more rapidly.

It will be seen that by providing my structure with the several described means for insuring rapid operation of the switches 12 in response to changes in temperature of the inner wall of the envelope, my arrangement is adaptable for stopping coolant circulation therethrough substantially immediately when it is not required and for effecting such circulation substantially immediately when it is required. Thus coolant can be conserved and operation of the device within a well-defined predetermined range can be obtained. When my invention is embodied in power conversion tubes such as the ignitron shown in the drawing and when a low temperature coolant is employed, my means for insuring rapid operation of the switching means in response to temperature changes of the inner wall can be effective in avoiding any deleterious effects of overcooling and attendant undesirable low vapor pressures in the tubes and also minimizes condensation or "sweating" on the outer wall of the tube. In my arrangement the switch adapted for controlling the coolant circulation can be adjusted to be so sensitive in operation that the predetermined temperature range can be maintained within very close limits, such as 1 to 2 degrees, irrespective of the temperature of coolant entering the chamber. That is, the high sensitivity and rapid response of the arrangement will allow only a very small amount of coolant to enter the cooling chamber at a time when the coolant is undesirably low in temperature. Thus, not even the area of the envelope adjacent the inlet to the chamber will have time to fall to the undesirably low temperature of the incoming coolant, and in any case only a small area near the bottom of the envelope will approach the temperature of the coolant. Comparatively large areas of the inner and outer walls of the envelope would have to fall to the undesirably low temperature or below the predetermined range to effect dangerously low vapor pressure in the tube and excessive "sweating" on its exterior, respectively.

The harmful effects of high vapor pressures in the tubes, as effected by overheating, can also be avoided by this provision of my invention. Additionally, operation of the device can be terminated automatically or manually in response to an alarm to the operator. Due to the extreme sensitivity of the control system, this alarm will be given immediately when the cooling means proves ineffectual and when the temperature attains a predetermined maximum above the desired operating range.

It will be seen further that while I have shown my invention applied to an electric discharge device of the ignitron type, it is equally applicable for controlling the cooling and over-temperature protection of any enveloped device which is subject to heating.

While I have shown and described a specific embodiment of my invention, I do not desire my invention to be limited to the particular form shown and described and I intend by the appended claims to cover all modifications within the spirit and scope of my invention.

What I claim as new and desire to secure by Letters Patent of the United States is:

1. An envelope adapted for housing a device subject to heating, a bowed strip having the ends thereof secured at spaced points on the exterior of said envelope, and a switch disposed externally of said envelope and operated by movements of said bowed strip as effected by relative expansion and contraction of said envelope and strip.

2. An envelope adapted for housing a device subject to heating, a bowed strip having the ends thereof secured at longitudinally spaced points on the exterior of said envelope, and a plurality of switching means each including an operating element disposed externally of said envelope and actuatable by different bowing movements of said bowed strip as effected by different degrees of relative expansion and contraction of said envelope and strip.

3. An envelope adapted for housing a device subject to heating, a bowed member having the ends thereof secured at spaced points on the exterior of said envelope, said bowed member being formed of a material having a smaller coefficient of expansion than that of said envelope, and switching means operable by bowing movements of said bowed member as effected by relative expansion and contraction of said envelope and bowed member.

4. An envelope adapted for housing a device subject to heating, a bowed member having the ends thereof secured at spaced points on the exterior of said envelope, said bowed member being formed of a material having a smaller coefficient of expansion than that of said envelope, and a plurality of switching means independently operable by different degrees of change in the bow of said bowed member as effected by different degrees of relative expansion and contraction of said envelope and bowed member.

5. An envelope adapted for housing a device subject to heating, said envelope including spaced inner and outer walls forming a chamber for having a coolant circulated therethrough, a bowed member having the ends thereof secured at spaced points on said outer wall, and switching means adapted for controlling coolant circulation through said chamber, said switching means being operable by said bowed member in response to changes in the bow of said bowed member as effected by relative elongation and contraction of said outer wall and said bowed member resulting from temperature changes of a device in said envelope, said inner wall expanding and thereby elongating said outer wall and contracting in direct response to temperature changes of a device housed by said envelope thereby to effect rapid changes in said bow of said bowed member and correspondingly rapid operation of said switching means in response to temperature changes of said device.

6. An envelope adapted for housing a device subject to heating, said envelope including spaced inner and outer walls forming a chamber for having a coolant circulated therethrough, a bowed member having the ends thereof secured at spaced points on said outer wall, and a plurality of switching means operative in response to different degrees of change in the bow of said bowed member as effected by different degrees of relative elongation and contraction of said outer wall and said bowed member, one of said switching means being adapted for controlling coolant circulation through said chamber, another of said switching means being adapted for avoiding over-heating of a device housed by said envelope, said inner wall expanding and thereby elongating said outer wall and contracting in direct response to temperature changes of a device housed by said envelope thereby to effect rapid changes in said bow of said bowed member and correspondingly rapid operation of said switching means in response to temperature changes of said device.

7. An envelope adapted for housing a device subject to heating, said envelope including spaced inner and outer walls forming a chamber for having a coolant circulated therethrough, a bowed member having the ends thereof secured at spaced points on said outer wall, said bowed member being formed of a material having a smaller coefficient of expansion than that of said envelope, and switching means operative in response to changes in the bow of said bowed member as effected by relative elongation and contraction of said outer wall and said bowed member, said switching means being adapted for controlling coolant circulation through said chamber, said inner wall expanding and thereby elongating said outer wall and contracting in direct response to temperature changes of a device housed by said envelope thereby to effect rapid changes in said bow of said bowed member and correspondingly rapid operation of said switching means in response to temperature changes of said device.

8. An envelope adapted for housing a device subject to heating, said envelope including spaced inner and outer walls forming a chamber for having a coolant circulated therethrough, a bowed member having the ends thereof secured at spaced points on said outer wall, said bowed member being formed of a material having a smaller coefficient of expansion than that of said envelope, and a plurality of switching means operative in response to different degrees of change in the bow of said bowed member as effected by different degrees of relative elongation and contraction of said outer wall and said bowed member, one of said switching means being adapted for controlling coolant circulation through said chamber, another of said switching means being adapted for avoiding over-heating of a device housed by said envelope, said inner wall expanding and thereby elongating said outer wall and contracting in direct response to temperature changes of said device thereby to effect rapid changes in said bow of said bowed member and correspondingly rapid operation of said switching means in response to temperature changes of said device.

9. An electric discharge device comprising; electrode elements including a cathode and anode effective for cooperating and generating substantial heat during normal operation of said device, an elongated envelope containing said electrodes, a bowed strip having the opposite ends thereof secured at longitudinally spaced points on the exterior of said envelope, and a switch operable by bowing movements of said bowed member as effected by relative thermal expansion and contraction of said envelope and said bowed member resulting from cooperation of said electrode elements.

10. An electric discharge device comprising; an envelope, a bowed member having the ends thereof secured at spaced points on the exterior of said envelope, said bowed member being formed of a material having a smaller coefficient of expansion than that of said envelope, and switching means adapted for controlling the operation of said device, said switching means being operable by changes in the bow of said bowed member as effected by relative expansion and contraction of said envelope and said bowed member resulting from temperature variations of said device.

11. An envelope adapted for housing a device subject to heating, a bowed member having the ends thereof secured at spaced points on the exterior of said envelope, said bowed member being formed of a material having a smaller coefficient of expansion than that of said envelope, the amount of bow in said bowed member being dependent upon the relative expansion and contraction of said envelope and said bowed member, and an operating member positioned between said bowed member and envelope and adapted for actuation by bowing movements of said bowed member, whereby said bowed member is adapted for controlling said operating member in response to temperature changes of a device housed in said envelope.

12. An envelope adapted for housing a device subject to heating, said envelope including spaced inner and outer walls forming a chamber for having a coolant circulated therethrough, a bowed member having the ends thereof secured at spaced points on said outer wall, the amount of bow in said bowed member being dependent upon the relative expansion and contraction of said outer wall and said bowed member, said inner wall expanding, and thereby elongating said outer wall, and contracting in direct response to temperature changes of a device housed by said envelope for effecting rapid changes in said bow of said bowed member, whereby said bowed member is adapted for controlling operating means rapidly in response to temperature changes of a device housed by said envelope.

13. An envelope adapted for housing a device subject to heating, said envelope including spaced inner and outer walls forming a chamber for having a coolant circulated therethrough, a bowed member having the ends thereof secured at spaced points on said outer wall, said bowed member being formed of a material having a smaller coefficient of expansion than that of said envelope, the amount of bow in said bowed member being dependent upon the relative expansion and contraction of said outer wall and said bowed member, said inner wall expanding, and thereby elongating said outer wall, and contracting in direct response to temperature changes of a device housed by said envelope for effecting rapid changes in said bow of said bowed member, whereby said bowed member is adapted for controlling operating means rapidly in response to temperature changes of a device housed by said envelope.

14. In an electric discharge device, an envelope, a bowed member having the ends thereof secured at spaced points on said envelope, said bowed member being formed of a material having a smaller coefficient of expansion than that of said envelope, the amount of bow in said bowed member being dependent upon the relative expansion and contraction of said envelope and said bowed member, and a switch for controlling said device, said switch being disposed externally of said envelope and operative in accordance with the amount of bow in said bowed member.

15. An electric discharge device comprising; an envelope, a pool-type electrode contained by said envelope, said electrode being adapted for having a portion thereof vaporized during operation of said device, said envelope including spaced inner and outer walls forming a chamber for having a coolant circulated therethrough, said coolant being adapted for cooling the walls of said chamber and thereby determining the vapor pressure in said device, a bowed member having the ends thereof secured at spaced points on the exterior of said outer wall, means carried by said bowed member adapted for controlling circulation of said coolant through said chamber, said last-mentioned means including an operating member engageable with said envelope and actuatable in accordance with the amount of bow in said bowed member, said amount of bow being dependent upon the relative expansion and contraction of said envelope and said bowed member, said inner wall expanding, and thereby elongating said outer wall, and contracting in direct response to internal temperature changes in said device thereby to effect rapid changes in said bow of said bowed member, whereby said bowed member is adapted for rapidly actuating said operating member in accordance with said temperature changes in said device.

16. An electric discharge device comprising; an envelope, a pool-type electrode contained by said envelope, said electrode being adapted for having a portion thereof vaporized during operation of said device, said envelope including spaced inner and outer walls forming a chamber for having a coolant circulated therethrough, said coolant being adapted for cooling the walls of said chamber and thereby determining the vapor pressure in said device, a bowed member having the ends thereof secured at spaced points on the external ends of said outer wall, said bowed member being formed of a material having a smaller coefficient of expansion than that of said envelope, means carried by said bowed member adapted for controlling circulation of said coolant through said chamber, said last-mentioned means including an operating member engageable with said envelope and actuatable in accordance with the amount of bow in said bowed member, said amount of bow being dependent upon the relative expansion and contraction of said envelope and said bowed member, said inner wall expanding, and thereby elongating said outer wall, and contracting in direct response to internal temperature changes in said device thereby to effect rapid changes in said bow of said bowed member, whereby said bowed member is adapted for rapidly actuating said operating member in accordance with said temperature change in said device.

17. An electric discharge device comprising; an envelope containing elements normally subject to a wide range of temperature variation, said envelope including coolant means for determining the limits of said range, an elongated bowed member having the ends thereof secured at spaced points on the exterior of said envelope so that the magnitude of bow of said bowed member corresponds to alterations of the distance between said spaced points as effected by thermal expansion and contraction of said envelope, and switching means adapted for controlling said coolant means, said switching means being operable in response to changes in the magnitude of bow of said bowed member thereby to control the operation of said coolant means in accordance with temperature variations of said device.

18. An electric discharge device comprising; an envelope containing elements normally subject to a wide range of temperature variation, said envelope including spaced inner and outer walls comprising coolant circulating means to determine the limits of said range, an elongated bowed member having the ends thereof secured at external opposite extreme portions of said envelope at which said inner and outer walls are conjoined so that the magnitude of bow of said bowed member corresponds to alterations of the distance between said extreme portions as effected by thermal expansion and contraction of said inner wall, and switching means adapted for controlling the effect of said coolant circulating means, said switching means being cooperative with said bowed member and operable in response to changes in the magnitude of bow of said bowed member to control said coolant circulating means.

19. An electric discharge device comprising; an envelope, a pool-type electrode contained by said envelope, said electrode being adapted for having a portion thereof vaporized during operation of said device, said envelope including spaced inner and outer walls forming a chamber for having a coolant circulated therethrough to cool said envelope and thereby determine the vapor pressure in said device, a bowed strip having the ends thereof secured externally on said envelope at the extreme opposite ends thereof, whereby bowing movements of said strip are effected directly in response to thermally caused elongations and contractions of said inner wall, and switching means adapted for controlling coolant circulation through said chamber, said switching means cooperating with said strip and including an operating member actuatable by said bowing movements of said strip.

20. An electric discharge device as in claim 19 in which the bowed strip is formed of a material having a smaller coefficient of expansion than that of said envelope.

21. An electric discharge device comprising; an envelope, a pool-type electrode contained by said envelope, said electrode being adapted for having a portion thereof vaporized during operation of said device, said envelope including spaced inner and outer walls forming a chamber for having a coolant circulated therethrough to cool said envelope and thereby determine the vapor pressure in said device, a bowed strip having the ends thereof secured externally on said envelope at the extreme opposite ends thereof, whereby bowing movements of said strip are effected directly in response to thermally caused elongations and contractions of said inner wall, and a plurality of switching means adapted for independently controlling the operating current of said device and coolant circulation through said chamber, said switching means cooperating with said strip and each including an operating member actuatable by a different degree of bowing movement of said strip.

22. An electric discharge device as in claim 21 in which the bowed strip is formed of a material having a smaller coefficient of expansion than that of said envelope.

23. An envelope adapted for housing a device subject to heating, a bowed strip having the ends thereof secured at spaced points on said envelope, said strip being adapted for bowing movements depending in magnitude upon the relative expansion and contraction of said envelope and strip as effected by temperature changes of a device housed in said envelope, and a switch carried by said strip, said switch including an operating member engageable with said envelope and adapted for being actuated to operate said switch by bowing movements of said strip.

References Cited in the file of this patent

UNITED STATES PATENTS

| Number | Name | Date |
|---|---|---|
| 471,351 | Evans | Mar. 22, 1892 |
| 1,358,713 | Killon | Nov. 16, 1920 |
| 1,402,417 | Hamilton | Jan. 3, 1922 |
| 1,487,353 | Nolte | Mar. 18, 1924 |
| 1,595,870 | Robinson | Aug. 10, 1926 |
| 1,752,204 | Sabbah | Mar. 25, 1930 |
| 1,766,802 | Sanders | June 24, 1930 |
| 1,779,696 | Gazelle | Oct. 28, 1930 |
| 1,941,310 | Lines | Dec. 26, 1933 |
| 2,296,063 | Shaw | Sept. 15, 1942 |
| 2,320,535 | Peterson | June 1, 1943 |
| 2,478,344 | Valverde | Aug. 9, 1949 |
| 2,584,924 | Reingruber et al. | Feb. 5, 1952 |
| 2,602,128 | Reingruber et al. | July 1, 1952 |